United States Patent
Thukral et al.

(10) Patent No.: US 9,378,141 B1
(45) Date of Patent: Jun. 28, 2016

(54) LOCAL CACHE PRE-WARMING

(71) Applicant: Symantec Corporation, Mountain View, CA (US)

(72) Inventors: Mithlesh Thukral, Maharashtra (IN); Mukesh Bafna, Pune (IN); Shirish Vijayvargiya, Pune (IN); Sanjay Jain, Maharashtra (IN); Sushil Patil, Maharashtra (IN); Sanjay Kumar, Patna (IN); Anindya Banerjee, Barrackpore (IN)

(73) Assignee: Veritas Technologies LLC, Mountain View, CA (US)

( * ) Notice: Subject to any disclaimer, the term of this patent is extended or adjusted under 35 U.S.C. 154(b) by 482 days.

(21) Appl. No.: 13/857,496

(22) Filed: Apr. 5, 2013

(51) Int. Cl.
*G06F 12/08* (2006.01)
*H04L 29/08* (2006.01)

(52) U.S. Cl.
CPC ........ *G06F 12/0813* (2013.01); *H04L 67/2842* (2013.01)

(58) Field of Classification Search
CPC ........................ H04L 67/2842; G06F 12/0813
See application file for complete search history.

(56) References Cited

U.S. PATENT DOCUMENTS

| 6,044,438 | A | * | 3/2000 | Olnowich | 711/130 |
| 2010/0232288 | A1 | * | 9/2010 | Coatney et al. | 370/221 |
| 2011/0179231 | A1 | * | 7/2011 | Roush | 711/152 |
| 2012/0089786 | A1 | * | 4/2012 | Pruthi | 711/141 |
| 2012/0215970 | A1 | * | 8/2012 | Shats | 711/103 |
| 2013/0019067 | A1 | * | 1/2013 | Vilayannur et al. | 711/144 |

FOREIGN PATENT DOCUMENTS

EP     2237518 A1 * 10/2010     H04L 29/08

* cited by examiner

*Primary Examiner* — Larry Donaghue
(74) *Attorney, Agent, or Firm* — Campbell Stephenson LLP (57) ABSTRACT

Caching metadata that identify hot blocks at a per local cache level are tracked. Tracked caching metadata are maintained so as to be persistent and shared across nodes of the cluster. Local caches are pre-warmed by using maintained caching metadata, responsive to detecting specific node level events. Such events can result in hot blocks being absent from a local cache, such as a failover between nodes or an unexpected failure local to a specific node. Another event example is the access of shared storage content, such as opening a file or mounting a file system by a specific node, in response to which the associated local cache can be pre-warmed using the tracked caching metadata for the specific file, or for each file of the file system. To pre-warm a local cache, hot blocks of stored content identified by corresponding caching metadata are loaded into the local cache.

20 Claims, 4 Drawing Sheets

LOCAL CACHE PRE-WARMING

TECHNICAL FIELD

This disclosure pertains generally to cache management, and more specifically to pre-warming local caches of nodes in a cluster.

BACKGROUND

Clusters are groups of computers that use groups of redundant computing resources in order to provide continued service when individual system components fail. More specifically, clusters eliminate single points of failure by providing multiple servers, multiple network connections, redundant data storage, etc. Absent clustering, if a server running a particular application fails, the application would be unavailable until the server is restored. In a clustering system, the failure of a server (or of a specific computing resource used thereby such as a network adapter, storage device, etc.) is detected, and the application that was being run on the failed server is automatically restarted on another computing system (i.e., another node of the cluster). This process is called "failover." Note that virtual machines (VMs) can be failed over between computing systems, as well as individual applications.

Clustering systems are often combined with storage management products that provide additional useful features, such as journaling file systems, logical volume management, multi-path input/output (I/O) functionality, etc. Where a cluster is implemented in conjunction with a storage management environment, the computer systems (nodes) of the cluster can access shared storage. The shared storage is typically implemented with multiple underlying physical storage devices, which are managed by the clustering and storage system so as to appear as a single storage device to computer systems accessing the shared storage.

An individual node of a cluster can use a non-shared, local cache. For example, the local cache can be in the form of a solid state drive (SSD) using fast integrated circuit based memory. The node can use its local cache for caching of shared storage content, which can significantly decrease latency. However, each such cache is local to the individual node and not shared between nodes in the cluster, whereas the shared storage is global to the cluster and shared between multiple nodes. Therefore, a node can erroneously read stale data from its local cache after a cluster based event affecting shared storage such as a failover, if cached blocks of shared storage are modified by another node of the cluster. Even absent that scenario, in the case of a failover or any event which causes a file on shared storage to be accessed from another node of the cluster, the local cache of the accessing node is cold, and is only slowly warmed as the access proceeds.

It would be desirable to address these issues.

SUMMARY

The local caches of nodes in a cluster are pre-warmed. The cluster has shared storage, and each node has an associated non-shared, local cache. Each local cache is accessible only to the node with which it is associated, and the shared storage is accessible by each node of the cluster. Hot blocks of shared storage content are cached in the local caches of the nodes. Caching metadata is tracked by nodes of the cluster. The tracked caching metadata identifies hot blocks at a per local cache level. Tracking caching metadata by a node can take the form of monitoring caching activity on the node, for example by tracking specific blocks of shared storage content present in the local cache on the node, or tracking which specific blocks of shared storage content are added to and evicted from the local cache on the node over time. Caching metadata can also be tracked by monitoring application level access of specific content on the shared storage. For example, caching metadata that identify specific blocks of shared storage content can be tracked, in response to the blocks being accessed at a specific threshold level within a given time period.

Caching metadata tracked by each node of the cluster are maintained so as to be persistent and shared across the nodes of the cluster. The tracked caching metadata can be stored on the shared storage (e.g., in a file), stored on a remote, cloud-based server, or maintained using cluster-level inter-node communication. In one embodiment, the caching metadata concerning specific files are stored with the corresponding file system level metadata.

Local caches are pre-warmed by using maintained caching metadata, responsive to detecting specific node level events that warrant cache pre-warming. Such an event can result in hot blocks being absent from a local cache, such as a failover between nodes or an unexpected failure local to a specific node. Another example of a detected event that can warrant pre-warming a local cache is the access of shared storage content, such as opening a file or mounting a file system by a specific node. For example, in response to detecting a specific file being opened by a node, the local cache associated with the node can be pre-warmed using the tracked caching metadata for the specific file. As another example, in response to detecting a file system being mounted by a node, the local cache associated with the node can be pre-warmed using the tracked caching metadata for each specific file of the file system. To pre-warm a local cache, hot blocks of stored content identified by corresponding caching metadata can be loaded into the local cache.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
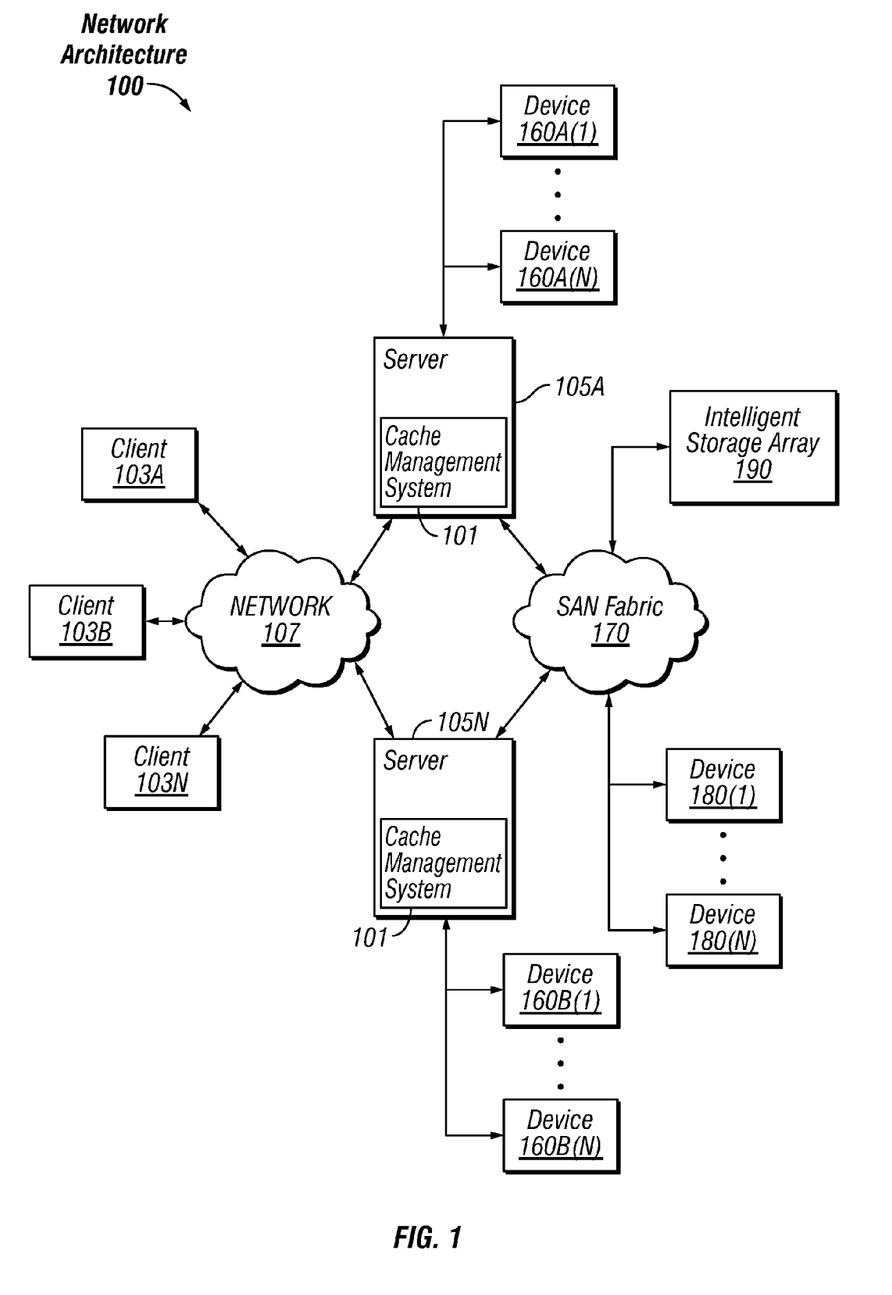
FIG. 1 is a block diagram of an exemplary network architecture in which a Cache management system can be implemented, according to some embodiments.

FIG. 1 is a block diagram illustrating an exemplary network architecture 100 in which a cache management system 101 can be implemented. In the illustrated network architecture 100, client systems 103A, 103B and 103N, as well as servers 105A and 105N, are communicatively coupled to a network 107. A cache management system 101 is illustrated as residing on servers 105A and 105N, but in other embodiments the cache management system 101 can reside on more, fewer or different computers 210 as desired. In FIG. 1, server 105A is further depicted as having storage devices 160A(1)-(N) directly attached, and server 105N is depicted with storage devices 160B(1)-(N) directly attached. Servers 105A and 105N are also connected to a SAN fabric 170 which supports access to storage devices 180(1)-(N) by servers 105A and 105N, and so by client systems 103A-N via network 107. Intelligent storage array 190 is also shown as an example of a specific storage device accessible via SAN fabric 170. In other embodiments, shared storage is implemented using FC and iSCSI (not illustrated) instead of (or in combination with) a SAN fabric 170.

Many different networking technologies can be used to provide connectivity from each of client computer systems 103A-N to network 107. Some examples include: LAN, WAN and various wireless technologies. Client systems 103A-N are able to access applications and/or data on server 105A or 105N using, for example, a web browser or other client software (not shown). This enables client systems 103A-N to run applications from an application server 105 and/or to access data hosted by a storage server 105 or one of storage devices 160A(1)-(N), 160B(1)-(N), 180(1)-(N) or intelligent storage array 190.

Although FIG. 1 illustrates three clients 103A-N and two servers 105A-N as an example, in practice many more (or fewer) computers can be deployed. In one embodiment, the network 107 is in the form of the Internet. Other networks 107 or network-based environments can be used in other embodiments.

Figure 2:
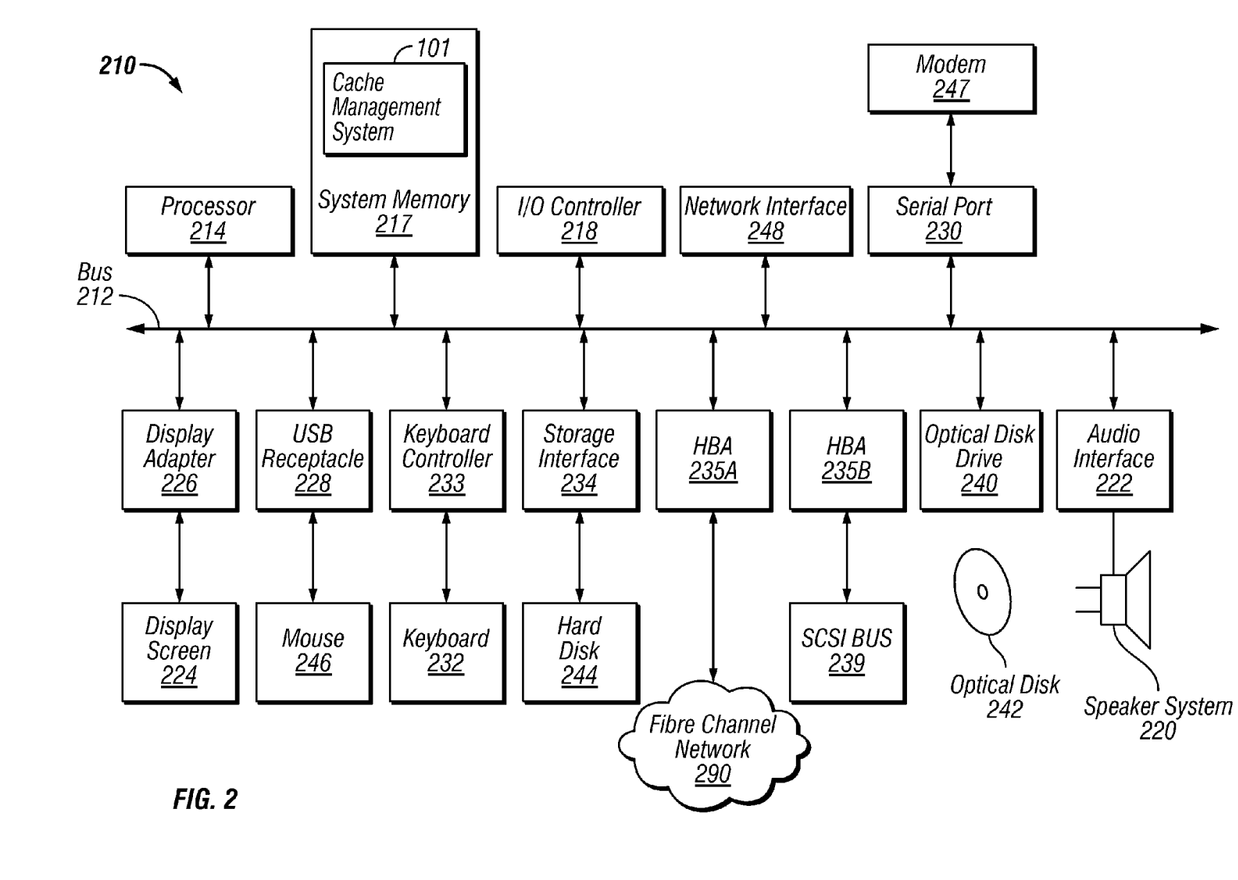
FIG. 2 is a block diagram of a computer system suitable for implementing a Cache management system, according to some embodiments.

FIG. 2 is a block diagram of a computer system 210 suitable for implementing a cache management system 101. The clients 103 and servers 105 illustrated in Figure can be in the form of computers 210 such as the one illustrated in FIG. 2. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the cache management system 101 is illustrated as residing in system memory 217. The workings of the cache management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
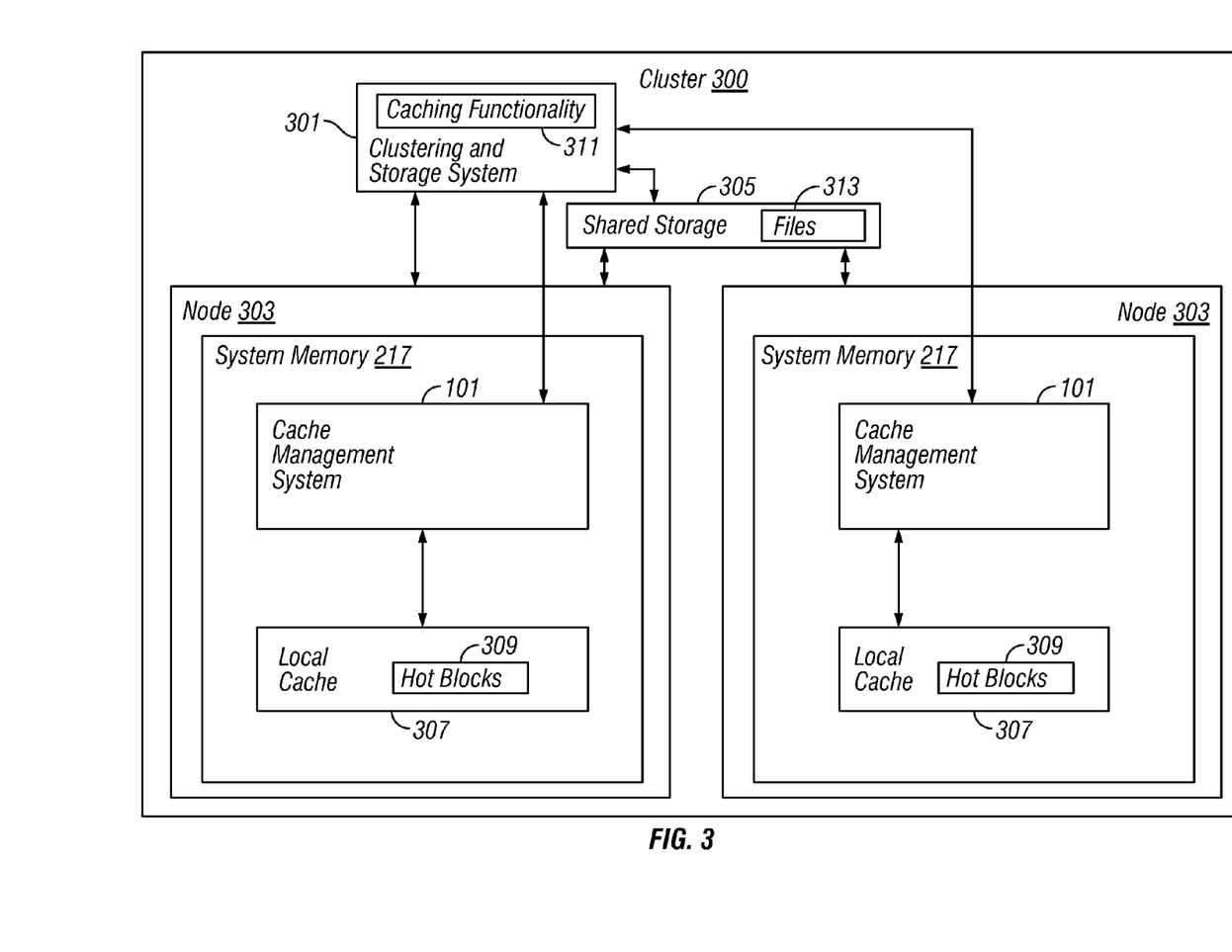
FIG. 3 is a block diagram of the operation of a Cache management system, according to some embodiments.

FIG. 3 illustrates the operation of a cache management system 101 within the context of a shared storage cluster 300, according to some embodiments. FIG. 3 illustrates an instance of a cache management system 101 running on each one of multiple nodes 303 (computer systems) of a cluster 300, wherein each node 303 is in the form of a computer system 210. It is to be understood that the functionalities of the cache management system 101 can reside on a server 105, client 103, or be distributed between multiple computer systems 210, including within a fabric/cloud-based computing environment in which the functionality of the cache management system 101 is provided as a service over a network 107. It is to be understood that although a cache management system 101 is illustrated in FIG. 3 as a single entity, the illustrated cache management system 101 represents a collection of functionalities, which can be instantiated as a single or multiple modules as desired. It is to be understood that the modules of the cache management system 101 can be instantiated (for example as object code or executable images) within the system memory 217 (e.g., RAM, ROM, flash memory) of any computer system 210, such that when at least one processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the cache management system 101 can be stored on computer-readable storage media, such that when the program code is loaded into computer memory 217 and executed by at least one processor 214 of the computer system 210, the computer system 210 executes the associated functionality. Any form of non-transitory computer readable medium can be used in this context, such as magnetic or optical storage media. As used herein, the term "computer readable medium" does not mean an electrical signal separate from an underlying physical medium.

FIG. 3 illustrates a cluster 300 instantiated in the context of a clustering and storage system 301 utilizing shared storage 305. For efficiency of illustration and explanation, the clustering and storage system 301 is illustrated as a centralized component residing outside of any node 303. It is to be understood that the clustering and storage system 301 represents a collection of functionalities, which in practice are typically instantiated as a plurality of components that are distributed throughout the cluster 300. Note also that although the shared storage 305 is illustrated and described in conjunction with FIG. 3 as if it were a single storage device 160, in practice it is typically implemented with multiple underlying physical storage devices 160, which are managed by the clustering and storage system 301 so as to appear as a single storage device 160 to computer systems 210 accessing the shared storage 305.

Although FIG. 3 illustrates a cluster 300 of only two nodes 303, it is to be understood that a cluster 300 can contain more (and in some embodiments many more) than two nodes 303. Each node 303 can be instantiated as a physical (or virtual) host computer 210, for example a physical computer 210 of the type illustrated in FIG. 2. Each illustrated node 303 has a local, non-shared cache 307. In one embodiment each non-shared cache 307 is instantiated in the form of an SSD drive. In other embodiments, other storage technologies can be used to implement local caches 307 as discussed in greater detail below. Local caches 307 are used by nodes 303 for caching of shared storage 305 content. Thus, as individual nodes 303 access the shared storage 305, the caching functionality 311 used by the clustering and storage system 301 can utilize the local caches 307 to cache shared storage data. Note that all of the shared storage data resides on the shared storage 305, and the caching functionality 311 can cache subsets of the shared storage data in local caches 307 to reduce access latency. The specific caching functionality 311 used by the clustering and storage system 301 determines which specific blocks of data to cache according to whatever caching algorithm it uses (e.g., a conventional or customized caching algorithm). The blocks that the caching functionality 311 determines to cache are known as the "hot blocks" 309. As described in more detail below, in different embodiments the caching can be performed at different levels. For example, in some embodiments the caching is performed at a file system level, in which specific blocks of specific files 313 are determined to be hot blocks 309 and cached by the caching functionality 311. In other embodiments the caching operates at other levels (e.g., at a virtual or physical volume level), and hot blocks 309 comprise specific sections of shared storage content at other levels accordingly. Regardless of the caching level, a cache management system 101 runs in the system memory 217 on each illustrated node 303, and implements various functionalities to provide local cache 307 pre-warming within the shared storage cluster 300, as described in detail below.

Figure 4:
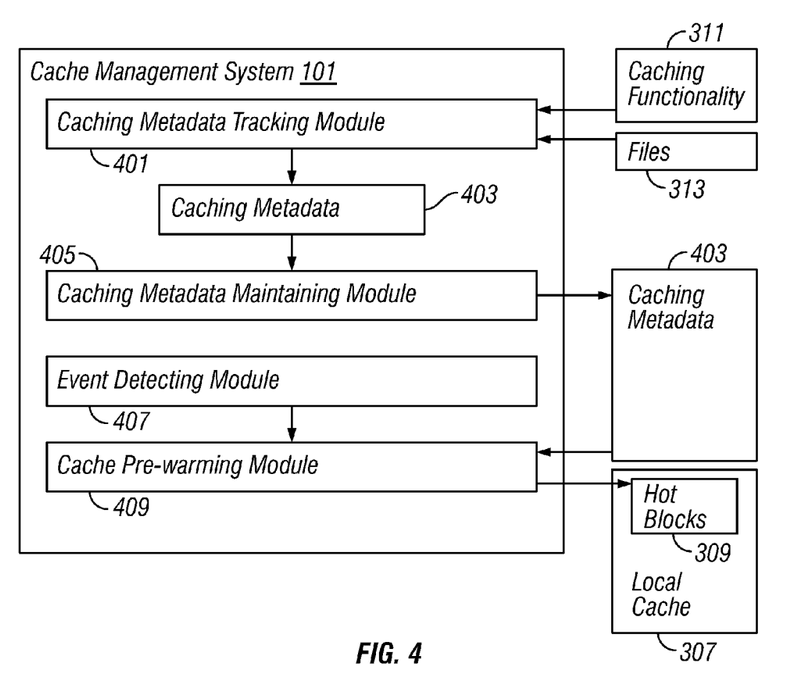
FIG. 4 is a flowchart illustrating steps of the operation of a Cache management system, according to some embodiments.

FIG. 4 illustrates specific modules of the cache management system 101, and describes their operation. A caching metadata tracking module 401 of the cache management system 101 tracks "caching metadata" 403. More specifically, an instance of the cache management system 101 runs on each node 303 of the cluster 300 (this is illustrated in FIG. 3). A specific instance of the caching metadata tracking module 401 on a given node 303 monitors caching activity, and tracks caching metadata 403 based on the interaction between the caching functionality 311 and the local cache 307 on the given node 303. As used herein the term "caching metadata" 403 means information concerning what data is used to populate the cache 307, e.g., data about what are the hot blocks 309 as determined by the caching functionality 311 in use. The caching metadata tracking module 401 can track caching metadata 403 at a per file 313 level, or at other levels such as per block of volume content or other unit of storage. The specific format of caching metadata 403 can vary between embodiments, depending upon, for example, the level at which the caching operates and/or is tracked. Caching metadata 403 can comprise data identifying the hot blocks 309 themselves, at a file 313 or lower level. Caching metadata 403 can be thought of as data concerning past caching activity, that can be used to repopulate the cache 307.

In some embodiments, the caching metadata tracking module 401 tracks which specific blocks of which specific files 313 (or other units of storage) are present in the cache 307. More specifically, this can comprise tracking which blocks (or other units) the caching functionality 311 adds to and evicts from the cache 307 over time. To track such information, the caching metadata tracking module 401 can monitor the caching functionality 311. To monitor the caching operations of interest, the caching metadata tracking module 401 can intercept or otherwise hook and/or wrap the relevant calls. The specific implementation mechanics to use for the monitoring varies between embodiments (e.g., system call interception, filter driver, etc.).

In some embodiments, instead of or in addition to monitoring the caching functionality, the caching metadata tracking module 401 can also track caching metadata 403 by monitoring application level access of specific content on the shared storage 305. For example, by monitoring shared storage access, the caching metadata tracking module 401 can identify shared storage content that is accessed to a sufficient extent such that it is to be identified by corresponding caching metadata 403. For example, the caching metadata tracking module 401 can identify the files 313 (or other portions) of storage accessed by an application within a given time period (the working set of the application workload). The caching metadata tracking module 401 can then determine to track caching metadata 403 identifying specific shared storage content (e.g., specific blocks of specific files 313) of the working set, in response to the blocks being accessed at a specific threshold level within a given time period. The exact threshold and specific time period to use in such calculations can vary between embodiments. The point is that by monitoring the access of shared storage content, the caching metadata tracking module 401 can treat content that is accessed requisitely heavily (e.g., content that is subject to a specific number, range or proportion of reads within a specific period of time) as being content to use in subsequent cache 307 pre-warming, and thus tracks caching metadata 403 for the content. Because the clustering and storage system 301 supports local node-level caching of shared storage content, operations that move content between a given node 303 and the shared storage 305 can result in the updating of the node's local cache 307, and hence can be used to track caching metadata 403 in some embodiments.

Examples of storage accessing operations that the caching metadata tracking module 401 monitors to this end in some embodiments include disk reads, disk writes, and other access operations targeting the shared storage 305 such as mount and format. To monitor the operations of interest, the caching metadata tracking module 401 can intercept or otherwise hook and/or wrap the relevant calls. The specific implementation mechanics to use for the monitoring varies between embodiments (e.g., system call interception, file system filter driver, etc.). Additionally, the exact level at which to monitor such functionality can also vary between embodiments (e.g., file system level, block level, operating system level, hardware level, etc.). The tracking can be performed at the level of individual data volumes (or smaller regions as explained below) of the shared storage 305.

A caching metadata maintaining module 405 of the cache management system 101 maintains (i.e., stores) the caching metadata 403 such that the caching metadata 403 can be accessed by any of the nodes 303 of the cluster 300. In other words, the caching metadata 403 is such that it is persistent and shared between nodes 303. The caching metadata maintaining module 405 on a given node 303 stores the caching metadata 403 tracked on that node 303. Because a cache management system 101 with a caching metadata maintaining module 405 runs on each node 303 of the cluster 300, the caching metadata 403 for each node 303 is maintained.

In different embodiments, the caching metadata maintaining module 405 can utilize different techniques to maintain caching metadata 403 such that it is persistent and shared between nodes 303. In one embodiment in which caching is tracked at a file system level, the caching metadata maintaining module 405 stores the caching metadata 403 for a given file 313 with the conventional file system level metadata for that given file 313. For example, Unix and similar file systems use a data structure called an inode to store information about a file system object (e.g., a file, device node, socket, pipe, etc.). The inode stores data about the corresponding file 313, rather than the file content (i.e., the inode stores metadata that describes the file content). Each file 313 is associated with an inode, which stores metadata about the file 313 such as ownership, read, write and execute permissions, file type, etc. Building on top of this structure, in one embodiment in which a file system using inodes is utilized within the cluster 300, the caching metadata maintaining module 405 stores the caching metadata 403 concerning a given file 313 in the corresponding inode (not illustrated) for the given file 313. It is to be understood that other file systems (e.g., ReFS, NTFS, FAT, etc.) use different data structures to store file object metadata. In embodiments where different file systems are used within the context of the cluster 300, the caching metadata maintaining module 405 can store caching metadata 403 with the corresponding file object metadata in the internal format of the given file system accordingly. Regardless, the various nodes 303 can access the file system utilized within the cluster 300, and thus by maintaining caching metadata 403 at a file system level, the caching metadata maintaining module 405 maintains the caching metadata 403 such that it is persistent and shared across nodes 303.

In other embodiments, the caching metadata maintaining module 405 maintains the caching metadata 403 for all files 313 in the file system in a common, global storage mechanism (e.g., a file 313, or other file system object, data structure, etc.). In one embodiment, the caching metadata maintaining module 405 maintains the global caching metadata 403 in a file 313 on the shared storage 305, which is thus accessible to all of the nodes of the cluster. As noted above, the shared storage mechanism used to maintain the tracked caching metadata 403 can be more complex than a file 313. For example, a database (not illustrated) can be used, which can be configured such that the caching metadata 403 is indexed according to the node 303 on which it was tracked and the file 313 to which it pertains. The point is that the caching metadata 403 for each node 303 of the cluster 300 is maintained on shared storage 305, such that any node 303 of the cluster 300 can retrieve caching metadata to pre-warm any specific local cache 307, as described in more detail below. In other embodiments, the caching metadata 403 is maintained on network based storage outside of the cluster 300, e.g., in the cloud. In other embodiments, cluster-level inter-node communication is used to maintain the caching metadata 403. Although the above passage refers to maintaining caching metadata 403 for each file 313 in the file system, it is to be understood that the caching metadata maintaining module 405 can use these same techniques (e.g., cluster-level shared storage 305, cloud based storage, inter-node communication) to maintain caching metadata 403 concerning storage units other than at a file 313 level (e.g., caching metadata 403 concerning all hot blocks 309 on a given volume).

An event detecting module 407 of the cache management system 101 detects events that warrant cache 307 pre-warming. In response to detecting such an event, the maintained caching metadata 403 can be used to pre-warm the local cache 307, as described in detail below. Describing the detecting process more specifically, certain events such as unexpected failures can result in hot blocks 309 being absent from the local cache 307 (a cold cache 307), and in response it desirable to pre-warm the cache 307 with the maintained caching metadata 405, which tracks what portions of which files 313 (or other stored content) comprise the hot blocks 309 and should be cached. Thus for example, in one embodiment the event detecting module 407 on a given node 303 detects the failover of an application (including the failover of a VM) from another node 303 to the node 303 on which the instance of the event detecting module 407 is running. In another embodiment, the event detecting module 407 also or instead detects unexpected failures of applications or VMs running locally on its node 303, which can result in hot blocks 309 being absent from the local cache 307. In addition to failure type events, the event detecting module 407 can detect file system access events, such as the opening of a specific file 313, the reading of a specific file 313, the mounting of a file system, etc. In other embodiments, events accessing the shared storage 305 at a level below the file system can also be detected (e.g., mounting a volume, reading a sector of a storage device, etc.), depending upon the level at which data is cached. In either case, in response to the access of stored content it can be desirable to pre-warm the cache 307 with the corresponding maintained hot blocks 309 (as identified by the caching metadata 403), and thus the event detecting module 407 can be configured to detect such events.

It is to be understood that in different embodiments the event detecting module 407 detects different events and/or different types of events. The specific events or event types in response to which to trigger cache pre-warming can vary between embodiments, and those are the events which the event detecting module 407 is configured to detect on a per embodiment basis. The event detecting module 407 can monitor file system access, lower level storage access, and/or specific system level functions in order to detect the embodiment specific events, as desired.

In response to detecting a triggering event as described above, a cache pre-warming module 409 of the cache management system 101 running on a given node 303 uses the appropriate tracked caching metadata 403 to pre-warm the local cache 307. For example, in response to detecting a specific file 313 being opened, the cache pre-warming module 409 accesses the tracked caching metadata 403 for that file 313, which identifies the hot blocks 309 for the file 313. The cache pre-warming module 409 then pre-warms the cache with those hot blocks 309. The same process can be executed in response to shared storage access at other than a file 313 level. In other words, in response to detecting the access of specific stored content at any level, the cache pre-warming module 409 can use the corresponding tracked caching metadata 403 to pre-warm the cache 307 with the hot blocks 309 for the accessed segment of content. In the case of a detected file 313 (or other storage unit) access operation, as the open (or other access call) returns, the cache pre-warming module 409 can run as a background process and pre-warm the cache 307. As another example, in response to detecting the occurrence of a mounting operation, the cache pre-warming module 409 can run as a background thread and pre-warm the cache 307 for all files 313 in file system being mounted (or for all the sections of the volume being mounted, etc.). Note that in response to failure type events, cache pre-warming can occur on the node 303 on which the failure occurred, or on another node (e.g., the target node 303 of a failover). It is to be understood that as used herein "pre-warming" a cache 307 means loading specific content (i.e., identified hot blocks 309) into the cache 307 so as to reduce latency of subsequent access. Thus, using caching metadata 403 to pre-warm the cache 307 comprises loading the hot blocks 309 of files 313 or other stored content identified by the corresponding caching metadata 403 into the cache 307. The detected triggering events indicate an imminent or upcoming access of the files 313 (or other storage content in question), and in response the cache 307 is pre-warmed with the corresponding hot blocks 309, thereby reducing the latency associated with the access operation. In some embodiments, the cache pre-warming module 409 uses caching metadata 403 tracked by all the nodes 303 to pre-warm a specific local cache 307, whereas in others only the caching metadata 403 as tracked by a specific target node 303 is used. In some embodiments, the cache pre-warming module 409 checks the contents of a local cache 307 before pre-warming, and does not redundantly load any content that is already present therein. In some embodiment, this check can be skipped, for example when the triggering event that resulted in the pre-warming is indicative of the need to repopulate the cache 307 (e.g., an unexpected failure).

It is to be understood that the shared storage 305 can be implemented in the form of an architecture such as a SAN fabric (or, e.g., FC or iSCSI). In other embodiments, the shared storage 305 is implemented via inter-node messaging. It is also to be understood that although the local caches 307 are illustrated as being physically local to their associated nodes 303, in some embodiments a local cache 307 can be logically local without being physically so. For example, a local cache 307 can be implemented on shared storage 305 but made logically local to given node 303 via, e.g., the caching functionality 311. In general, "shared" and "local" are functional descriptors, and storage, caches and other objects can be implemented as shared or local by using logical and/or physical resources as desired.

It is also to be understood that although the cache management system 101 can work in conjunction with and/or enhance the performance of the caching functionality 311 as described above, the cache management system 101 is agnostic as to the specific caching algorithm(s) used by the caching functionality 311. In some embodiments the caching is performed at a file system level (e.g., specific blocks of specific files 313 are cached), whereas in other embodiments the caching is implemented at other levels (e.g., at a virtual or physical volume level).

Although the cache management system 101 is described above as working in the context of a cluster 300 with shared storage 305, in other embodiments a cache management system 101 can operate on a non-clustered computer system 210 (or a computer system 210 in a cluster 300 without shared storage 305), wherein the cache management system 101 can use the above-described functionality to pre-warm the cache 307 and keep it persistent between unexpected failures.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for cache pre-warming in a cluster of nodes, each node having an associated non-shared, local cache, wherein the cluster further comprises shared storage, the method comprising the steps of:
    nodes of the cluster using associated local caches to cache hot blocks of shared storage content, wherein each local cache is accessible only to the node with which it is associated, and wherein the shared storage is accessible by each node of the cluster;
    tracking caching metadata by nodes of the cluster, wherein the tracked caching metadata identifies hot blocks at a per local cache level;
    maintaining caching metadata tracked by each node of the cluster, wherein the maintained caching metadata is persistent and shared across the nodes of the cluster; and
    pre-warming local caches by nodes of the cluster by using maintained caching metadata, responsive to detecting specific node level events.

2. The method of claim 1 wherein tracking caching metadata by a node further comprises:
    monitoring caching activity on the node.

3. The method of claim 1 wherein tracking caching metadata by a node further comprises:
    tracking specific blocks of shared storage content present in the local cache on the node.

4. The method of claim 1 wherein tracking caching metadata by a node further comprises:
    tracking which specific blocks of shared storage content are added to and evicted from the local cache on the node over time.

5. The method of claim 1 wherein tracking caching metadata further comprises:
    monitoring application level access of specific content on the shared storage.

6. The method of claim 1 wherein tracking caching metadata further comprises:
    tracking caching metadata identifying specific blocks of shared storage content, in response to the blocks being accessed at a specific threshold level within a given time period.

7. The method of claim 1 wherein maintaining caching metadata further comprises:
    storing caching metadata concerning each specific one of multiple files with corresponding file system level metadata concerning the specific file.

8. The method of claim 1 wherein maintaining caching metadata further comprises:

storing the tracked caching metadata on the shared storage, such that the stored caching metadata is persistent and shared across the nodes of the cluster.

9. The method of claim 1 wherein maintaining caching metadata further comprises:
   storing the tracked caching metadata on a remote, cloud-based server computer, such that the stored caching metadata is persistent and shared across the nodes of the cluster.

10. The method of claim 1 wherein maintaining caching metadata further comprises:
    using cluster-level inter-node communication to maintain the tracked caching metadata.

11. The method of claim 1 wherein pre-warming a local cache by using maintained caching metadata responsive to detecting a specific node level event further comprises:
    in response to detecting a specific file being opened by a node, pre-warming the local cache associated with the node using the tracked caching metadata for the specific file, wherein the tracked caching metadata for the specific file identifies hot blocks for the specific file.

12. The method of claim 1 wherein pre-warming a local cache by using maintained caching metadata responsive to detecting a specific node level event further comprises:
    in response to detecting a file system being mounted by a node, pre-warming the local cache associated with the node using the tracked caching metadata for each specific file of the file system, wherein the tracked caching metadata for each specific file identifies hot blocks for the specific file.

13. The method of claim 1 wherein pre-warming a local cache by using maintained caching metadata further comprises:
    loading hot blocks of stored content identified by corresponding caching metadata into the local cache.

14. The method of claim 1 further comprising:
    detecting events that warrant pre-warming of at least one local cache.

15. The method of claim 14 wherein detecting an event that warrants pre-warming of a local cache further comprises:
    detecting an event resulting in hot blocks being absent from the local cache.

16. The method of claim 14 wherein detecting an event that warrants pre-warming of a local cache further comprises:
    detecting a failover from a first node to a second node.

17. The method of claim 14 wherein detecting an event that warrants pre-warming of a local cache further comprises:
    detecting an unexpected failure local to a specific node.

18. The method of claim 14 wherein detecting an event that warrants pre-warming of a local cache further comprises:
    detecting access of shared storage content by a specific node.

19. At least one non-transitory computer readable-storage medium for cache pre-warming in a cluster of nodes, each node having an associated non-shared, local cache, wherein the cluster further comprises shared storage, the at least one non-transitory computer readable-storage medium storing computer executable instructions that, when loaded into computer memory and executed by at least one processor of a computing device, cause the computing device to perform the following steps:
    nodes of the cluster using associated local caches to cache hot blocks of shared storage content, wherein each local cache is accessible only to the node with which it is associated, and wherein the shared storage is accessible by each node of the cluster;
    tracking caching metadata by nodes of the cluster, wherein the tracked caching metadata identifies hot blocks at a per local cache level;
    maintaining caching metadata tracked by each node of the cluster, wherein the maintained caching metadata is persistent and shared across the nodes of the cluster; and
    pre-warming local caches by nodes of the cluster by using maintained caching metadata, responsive to detecting specific node level events.

20. A computer system for cache pre-warming in a cluster of nodes, each node having an associated non-shared, local cache, wherein the cluster further comprises shared storage, wherein nodes of the cluster using associated local caches to cache hot blocks of shared storage content, wherein each local cache is accessible only to the node with which it is associated, and wherein the shared storage is accessible by each node of the cluster, the computer system comprising:
    system memory;
    a caching metadata tracking module residing in the system memory, the caching metadata tracking module being programmed to track caching metadata by nodes of the cluster, wherein the tracked caching metadata identifies hot blocks at a per local cache level;
    a caching metadata maintaining module residing in the system memory, the caching metadata maintaining module being programmed to maintain caching metadata tracked by each node of the cluster, wherein the maintained caching metadata is persistent and shared across the nodes of the cluster; and
    a cache pre-warming module residing in the system memory, the cache pre-warming module being programmed to pre-warm local caches by nodes of the cluster by using maintained caching metadata, responsive to detecting specific node level events.

* * * * *